United States Patent [19]

Blount

[11] 4,125,498

[45] Nov. 14, 1978

[54] PROCESS FOR THE PRODUCTION OF POLYESTER-SILICATE RESINOUS PRODUCTS

[76] Inventor: David H. Blount, 5450 Lea St., San Diego, Calif. 92105

[21] Appl. No.: 794,915

[22] Filed: May 9, 1977

Related U.S. Application Data

[63] Continuation-in-part of Ser. No. 653,727, Jan. 30, 1976, abandoned, which is a continuation-in-part of Ser. No. 562,201, Apr. 14, 1975, abandoned.

[51] Int. Cl.² ............................................. C08L 91/00
[52] U.S. Cl. .................................. 260/18 S; 260/827; 528/14; 528/15; 528/21; 528/25; 528/39; 528/26; 528/44; 528/192; 528/195; 521/154; 521/172

[58] Field of Search .......... 260/2 S, 2.5 AM, 2.5 AN, 260/18 S, 77.5 AN, 77.5 AP, 827, 75 SB; 423/324, 325, 326

[56] References Cited

U.S. PATENT DOCUMENTS

| | | | |
|---|---|---|---|
| 3,937,782 | 2/1976 | Blount | 423/325 |
| 3,956,466 | 5/1976 | Blount | 423/325 |
| 3,960,747 | 6/1976 | Blount | 252/182 |
| 3,962,067 | 6/1976 | Blount | 252/182 |
| 3,962,111 | 6/1976 | Blount | 423/325 |

*Primary Examiner*—Melvyn I. Marquis

[57] ABSTRACT

Polyester-silicate resinous products are produced when a dibasic acid, a silicic acid and a dihydric alcohol are heated with a suitable alkali catalyst.

8 Claims, No Drawings

PROCESS FOR THE PRODUCTION OF POLYESTER-SILICATE RESINOUS PRODUCTS

CROSS-REFERENCE TO RELATED CO-PENDING APPLICATION

This application is a continuation-in-part of U.S. Patent Application Serial No. 653,727, filed Jan. 30, 1976, now abandoned, which is a continuation-in-part of U.S. Pat. application Ser. No. 562,201, filed Apr. 14, 1975, now abandoned.

BACKGROUND OF THE INVENTION

This invention relates to a process for the production of polyester-silicate resinous products by chemically reacting a silicic acid with a ω-hydroxy acid or by reacting a silicic acid with a dibasic acid and a dihydric alcohol by heating the mixture in the presence of an alkali catalyst.

For the purpose of this invention, the products produced by this instant process will be named polyester-silicate resinous products.

The silicic acid compound used in this process may be produced by the chemical reaction of a dry alkali metal metasilicate with a mineral acid or an acid hydrogen containing salt. The silicic acid compound used in the following examples was produced by reacting dry granular alkali metal metasilicate with an hydrogen containing acid salt or a concentrated mineral acid. The white granular silicic acid is washed with water, filtered, and then air dried at 25° to 75° C.

The white granular silicic acid was analyzed by Infrared Analysis, using the IR KBr disc method. The Infrared Analysis was very similar to that obtained with Mallinckrodt's hydrated silica standard, except for the area which shows the presence of Si-H bonds. The Mallinckrodt's hydrated silica ($SiO_2.xH_2O$) has a molecular weight of $60.09.xH_2O$. The said silicic acid contains an active hydrogen which will reduce silver nitrate in an aqueous solution; this is evidence that Si-H bonds are present.

When the said silicic acid is heated to much above 105° C, silicon dioxide with a molecular weight of about 60 is produced. The molecular weight was determined from the boiling point elevation of said silicic acid in a 6N hydroxide solution and indicated a molecular weight of 78 ± 25 gm/mol. This type of reaction solution normally changes the molecular species. However, this would seem to indicate the absence of a polymeric form of silicate. This analysis may indicate a possible formula of $HSi(OH)_3$ (orthosilicoformic acid) and $SiO_2.xH_2O$ (hydrated silica). The orthosilicoformic acid, when dried, will lose water to form siliconformic acid (H.SiO.OH). Hydrated silica produced by any of the commonly known processes may be used in this invention.

The silicic acid compound will react chemically with a dihydric or polyhydric alcohol by heating the mixture in the presence of an alkali catalyst to produce an organic alcohol silicate compound which will react chemically with a dibasic acid to produce a polyestersilicate resinous product. The silicic acid compound will react chemically with a dibasic acid by heating the mixture in the presence of an alkali catalyst to produce an organic acid silicate.

The silicic acid will react chemically with either saturated and/or unsaturated polyfunctional acids and alcohols to eventually form cross-linked, three dimensional esters. The unsaturated polyester silicate may be cured with a small amount of a peroxide. An excess of the dihydric alcohol may be used in the production of polyester-silicate resinous products. The aliphatic and aromatic dicarboxylic acids may be used in this process. The drying oil acids may be used in this process.

The unsaturated polyester-silicate resinous products may be reacted with vinyl monomers to produce a cross-linked, three-dimensional resin. The resin is cured by the use of free-radical initiators, such as peroxides and azo compounds. The action of the organic peroxide can be modified by activators and promoters.

The polyester-silicate polymers may be utilized in coatings for linoleum, leather, fabrics, and rubber. They may be utilized in paints, lacquers, metal primers, caulking compounds and water-emulsion paints. They may be copolymerized with a vinyl monomer to produce hard, solid, useful objects, or they may be used in conjunction with a reinforcing filler, such as glass fiber, paper or cloth to produce a laminate of outstanding strength and durability. They may be used as a molding powder, as an adhesive and as impregnants. They may be chemically reacted with isocyanate to produce polyurethane silicate resin and foams.

SUMMARY OF THE INVENTION

I have discovered that silicic acid will react chemically with alcohols, acids, anhydrides or mixed compounds containing both alcohols and acid radicals when heated in the presence of a small amount of alkali catalyst at a temperature from just above the melting temperature of the dicarboxylic acid and about the boiling temperature of the polyhydroxyl alcohol or dihydric alcohol to produce polyester-silicate resinous products.

When silicic acid is heated with a dihydric or polyhydroxyl alcohol in the presence of an alkali catalyst, an organic alcohol silicate is produced. The organic alcohol silicate may be further reacted with a dibasic or polycarboxylic acid by heating, thereby producing a polyester-silicate resinous product.

When silicic acid is heated with a dicarboxylic acid or a polycarboxylic acid in the presence of a small amount of alkali catalyst at a temperature from just above the melting temperature of the acid and below the boiling point of the acid in the ratio of about 1 to 1 mols, an organic acid silicate is produced. The organic acid silicate may be chemically reacted with a dihydroxyl or polyhydroxyl alcohol to produce a polyester-silicate resinous product by mixing and then heating the mixture.

When silicic acid is heated with a dicarboxylic organic acid and a dihydric alcohol in the ratio of about 1 to 1 mols and in the presence of a small amount of an alkali, a polyester-silicate resinous product is produced.

While the specific reactions which take place are not fully understood, typical reactions are believed to occur as follows:

Silicic acid is theorized to react with a dihydric alcohol as follows:

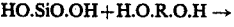

Silicic acid is theorized to react with a dicarboxylic acid as follows:

Silicic acid is theorized to react with a dihydric alcohol and an organic dicarboxylic acid as follows:

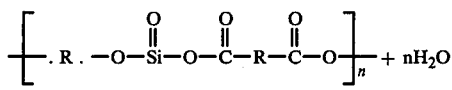

Wherein R is an aliphatic or an aromatic radical and $n$ is 2 or more.

DETAILED DESCRIPTION OF THE INVENTION

Any suitable organic dihydroxyl or polyhydroxyl alcohol may be used in the process of this invention. Typical dihydroxyl alcohols include ethylene glycol, propylene glycol, butylene glycol, trimethylene glycol, tetramethylene glycol, pentamethylene glycol, hexamethylene glycol, diethylene glycol, triethylene glycol, polybutylene glycol, bis($\beta$-hydroxyethyl) terephthalate, Bisphenol A, resorcinol, 2,2'-oxydiethanol, polypropylene glycol, polyethylene glycol and mixtures thereof.

Any suitable organic polyhydroxyl alcohol may be used in the process of this invention. Typical polyhydroxyl alcohols include glycerol monochlorohydrin, glycerol, pentaerythritol, di and tripentaerythritol, trimethylol ethane, trimethylel propane, sorbitol, manitol and mixtures thereof.

Any suitable organic dicarboxylic acid may be used in the process of this invention. Typical dicarboxylic acids include maleic, phthalic, succinic, oxalic, malonic, glutaric, adipic, pimelic, suberic, isophthalic, fumaric, azelaic, sebacic, terephthalic, itaconic, malic, tartaric and mixtures thereof.

All or part of the organic dicarboxylic acid may be replaced with any suitable dicarboxylic anhydride such as phthalic, succinic, glutaric, tetrachlorophthalic, camphoric, diglycolic, pyromellitic, tetrahydrophthalic, dodecenylsuccinic, hexadecylsuccinic, nitrophthhalic, poly(adipic anhydride) and mixtures thereof.

Any suitable oils such as vegetable oils containing hydroxyl and/or carboxylic groups may be used in the process of this invention. Typical vegetable oils include soya bean, linseed, cottonseed, castor, dehydrated castor, tall, tung, fish, perilla, oiticica, sunflower, walnut oils and mixtures thereof. The various oils may be converted to a monoglyceride before being added in my novel process.

Any suitable organic compound containing a hydroxyl and a carboxylic radical may be used in the process of this invention. Typical compounds containing a hydroxyl and carboxylic radical include 10-hydroxy undecanoic acid, 2-hydroxy decanoic acid, $\omega$-hydroxy pentadecanoic acid, monoglycerides of hard fatty acids, malic acid and mixtures thereof. These compounds may replace all or part of the dicarboxylic acids and dihydric alcohols. Ethylene succinate, ethylene sebacic acid and monoglycerides of hard fatty acids may be used in the process of this invention.

Other suitable organic compounds may be used in my novel process to modify the polyester silicate polymer such as allyl alcohol, allyl chloride, diethylene glycol bis(allyl carbonate), diallyl benzene phosphonate, allyl itaconate, triallyl cyanurate, cyclopentadiene, terpenes, amino parabenzoic acid, benzoic acid, p-tert-butyl benzoic acid, phenoplasts, aminoplasts, acrylic acid, methacrylic acid, cellulose nitrate, ethyl cellulose, chlorinated rubber, a silicone intermediate, natural resins, styrene, isocyanates, aliphatic diamines, triamines and tetramines, aromatic diamines, dimethyl propylene glycol, glycerol monophenyl ether, thiodiethylene glycol, diallyl phthalate, diallyl maleate, diallyl fumarate, methallyl methacrylate, sulfur monochloride isocyanates, linear polycarbonates, dicarboxylic anhydrides, and mixtures thereof.

Any suitable alkali catalyst may be used to promote the chemical reaction. The catalytic mechanism which takes place is not fully understood. The alkali may act as a catalyst directly, or it may react slightly with one or the other of the primary reactants. From about 1 to 10 weight percent catalyst, based on the weight of reactants, silicic acid, dihydric alcohol and dicarboxyylic acid used gives best results. Since the alkali can react with the silicic and dicarboxylic acids, the use of large amounts of alkali should be avoided. Typical alkalis include alkali metal carbonates, hydroxides, oxides and salts of weak acids. The preferred catalysts are the alkali metal carbonates with best results being obtained with sodium carbonate.

In my novel process of this invention, the preferred process is to react chemically a dry granular silicic acid, a dihydric alcohol and a dicarboxylic acid in the ratio of about equal mols, in the presence of sodium carbonate (1 to 10% by weight), by heating the mixture to above the melting temperature of the dicarboxylic acid but below the boiling temperature of the dihydric alcohol or dicarboxylic acid and until the chemical reaction is substantially complete, thereby producing a polyester-silicate resinous product.

In some of the reactions, the polyester-silicate resinous products may be improved by neutralizing the alkali catalyst with a mineral acid or an organic acid after the silicic acid has reacted chemically with the polyhydroxyl alcohol and polycarboxylic acid.

The acid compound may be added to the polyester-silicate resinous product until the pH is about 4 to 6 as tested in an aqueous suspension. The acid group may be selected from a group consisting or hydrochloric acid, sulfuric acid, phosphoric acid, acetic acid, formic acid and sodium hydrogen sulfate. This acid group may be used in place of the alkali catalyst in this invention, although the alkali catalyst is preferred and appears to give the best results in the production of polyester-silicate resinous products.

The polyester-silicate resinous products produced by my novel process may be co-polymerized with vinyl monomers including acrylates, methacrylates, acrylonitrile, vinyl acetate, vinyl toluene and styrene by using a peroxide initiator. Various peroxide initiators may be used, but ethyl ketone peroxide with cobalt naphthenate is preferred. Various other peroxide initiators may be used such as hydrogen peroxide, cumene hydroperoxide, p-menthane hydroperoxide, and others. A redox system of initiation may be used. Benzoyl peroxide with a tertiary amine activator, such as N,N-dimethyl aniline may be used. Organic peroxides and hydroperoxides such as di-tert-butyl diperphthalate, tert-butyl hydroperoxide, tert-butyl perbenzoate, cyclohexanone peroxide, cumene hydroperoxide, benoyl peroxide, acetyl benzoyl peroxide, p-chlorobenzoyl peroxide, alkoxy benzoyl peroxide, lauroyl peroxide, dibutyryl peroxide, dicaproyl peroxide, crotonyl peroxide, di-tert-alkyl peroxides, methyl amyl ketone peroxide, di-tert butyl diphosphate peroxide, peracetic acid, cyclohexyl hypoperoxide and mixtures thereof. Activators and promoters may be used in conjunction with initiators, such as cobalt naphthenate, tertiary dialkyl aryl amines and aliphatic thiols in concentrations of 0.05 to 0.5 per cent of active substance. A photosensitizer may be used to initiate polymerization. The polyester-silicate condensation product may be further reacted with an organic isocyanate to produce a resinous product or a foam by mixing 1 to 2 parts by weight of the polyester-silicate resinous product with about 1 part by weight of the isocyanate. If desired, suitable amounts of modifiers such as alkylated phenoxy, polyethoxy, ethanol, ammonium oleate, sulphenated castor oil, manganous chloride, zinc stearate, parafin oil, calcium stearate, dioctyl sulfosuccinate, and mixtures thereof maybe added. Any suitable foaming agent and/or catalyst, 1 to 10 percent by weight, may be used to foam these resins. Typical additives include water; cobalt naphthenate; N-methylmorphatine; dimethyl ethanolamine; triethylamine; N,N'-diethylcyclohexylamine; N,N'-dimethylcyclohexylamine; acetic acid; organic tin compounds and mixtures thereof. Water, together with an amine or tin compound catalyst, has been found to be especially effective and is therefore preferred.

Any suitable isocyanate may be used in the process of this invention. Typical isocyanates include toluene-2,4-diisocyanate; toluene-2,6-diisocyanate; diphenylmethane-2,4-diisocyanate; meta-phenylene diisocyanate; triphenylmethane triisocyanate; hexamethylene diisocyanate; dianisidine diisocyanate; xenylene diisocyanate; dichloroxenylene diisocyanate; naphthalene-1,5-diisocyanate; diphenyl sulfone-1,4-diisocyanate; 2-nitrodiphenyl-4,4'-diisocyanate; 3,3'-dimethyldiphenylmethane4,4'-diisocyanate; and mixtures thereof. Best results are generally obtained with toluene-2,4-diisocyanate, toluene-2,6-diisocyanate and mixtures thereof.

The primary object of the present invention is to produce polyester-silicate resinous products. Another object is to produce polyester-silicate resinous products that can be copolymerized with vinyl monomers to produce new polyester-silicate resinous products. Still another object is to produce polyester-silicate resinous products that can be chemically reacted with organic isocyanate compounds to produce useful urethane silicate resins and foams. A further object is to produce polyester-silicate resinous products that are readily soluble in organic solvents and may be used as a protective coating on wood.

DESCRIPTION OF PREFERRED EMBODIMENTS

My invention will be illustrated in greater detail by the specific examples that follow, it being understood that these preferred embodiments are illustrative of, but not limited to, procedures which may be used in the production of polyester silicate resinous products. Parts and percentages are be weight unles otherwise indicated.

EXAMPLE I

About 150 parts by weight of sodium metasilicate pentahydrate are slowly added to about 75 parts by weight of concentrated sulfuric acid while agitating and keeping the temperature below 100° C. The reaction takes place under ambient pressure, and the reaction is complete in 1 to 2 hours, thereby producing a white granular silicic acid compound and sodium sulfate. The mixture is washed with water then filtered to remove the salt and water, thereby recovering the silicic acid compound. The silicic acid compound is air dried at 25° to 75° C.

About 20 parts by weight of the air dried granular silicic acid, about 20 parts by weight of phthalic acid, about 20 parts by weight of ethylene glycol, and about 5 parts by weight of sodium carbonate are mixed, then heated to a temperature between the melting point of phthalic acid and the boiling point of ethylene glycol for about 30 minutes. The temperature is then gradually increased from 150° C to 250° C for 30 to 90 minutes or until the desired viscosity is obtained, thereby producing a light brown, polyester-silicate resinous product, poly(ethylene phthalic silicate ester).

The polyester-silicate resinous product is soluble in acetic acid. The solution of the polyester-silicate resinous product may be painted on wood and produces a tough, protective coating when dried.

EXAMPLE II

About 20 parts by weight of a dry granular silicic acid (hydrated silica), about 20 parts by weight of maleic acid, about 20 parts by weight of propylene glycol and about 6 parts by weight of potassium carbonate are mixed then heated to 150° to 250° C for 30 to 90 minutes or until the desired viscosity is obtained, thereby producing a brown polyester-silicate resinous product, poly(propylene maleic silicate ester). The resinous product may be produced as a thick liquid or a hard solid.

The thick liquid (viscosity of 500 to 1,500 poises) is mixed with styrene in the ratio of about 2 to 1 parts by weight. Then a catalytic amount of a peroxide initiator, methyl ethyl ketone peroxide(0.2 to 0.5 parts by weight), and an activator, cobalt naphthenate (30 to 100 ppm of cobalt metal), are added and mixed at a temperature of 30° to 60° C, thereby producing a hard, solid, condensation product in 20 to 60 minutes. The above solution may be applied to a fiberglass cloth to produce rigid sheets and may be used to build boats, roofing, containers, etc.

EXAMPLE III

About equal parts by weight of a dry potassium metasilicate, containing less than 6 mols of water per mol of potassium metasilicate and potassium hydrogen sulfate, are mixed. The mixture is agitated at ambient pressure, the chemical reaction starts in 2 to 5 minutes and considerable heat is produced. The chemical reaction is complete in 1 to 2 hours, thereby producing white granules of a silicic acid compound and potassium sulfate. The mixture is washed with water and filtered to remove the salt. The silicic acid compound is air dried at 25° to 75° C.

About 20 parts by wweight of the dry granular silicic acid, about 20 parts by weight of glycerol and about 3 parts by weight of sodium carbonate are mixed. The mixture is then heated to just below the boiling temperature of glycerol (150° to 250° C) for 20 to 60 minutes while agitating at ambient pressure, thereby producing light brown granules of glycerol silicate. The glycerol silicate was analyzed by Infrared Analysis, using the IR KBr Disk method. When the analysis was compared to the glycerol infrared standard it showed major changes, indicating the formation of a new compound.

40 parts by weight off the glycerol silicate compound and 20 parts by weight of phthalic acid are heated to above the melting temperature of phthalic acid (150° to 250° C) while agitating at ambient pressure for about 30 to 60 minutes. Dilute sulfuric acid is added to the mixture until the pH is about 4 to 6 (as tested in an aqueous suspension). The mixture is then heated at 150° to 250° C for 30 to 60 minutes until the desired viscosity or hardness is obtained, thereby producing a polyester-silicate resinous product (glycerol phthalic silicate ester).

The said polyester-silicate resinous product is soluble in ethylene glycol, acetic acid, acetone and other organic solvents. It has a melting point of about 80° C but varies with molecular size. A solution of the said polyester-silicate condensation products was filtered, and about 15 to 30% by weight of the said silicic acid was filtered out unreacted.

EXAMPLE IV

About 1 mol of silicic acid, mols calculated on the basis of the silicon dioxide content, one mol of adipic acid, one mol of ethylene glycol and about 0.1 mol of sodium carbonate are mixed then heated to 150° to 250° C for 30 to 90 minutes while agitating at ambient pressure, thereby producing a light brown polyester-silicate resinous product.

About 1 part by weight of the said polyester-silicate resinous product is mixed with about 1 part by weight of toluene diisocyanate, then agitated at ambient pressure for about 5 to 15 minutes until a cream colored mixture is produced. About 3% by weight of an activator (an aqueous solution containing 10% sodium dioctyl sulfosuccinate) is mixed with the said mixture and agitated until the mixture begins to expand to 5 to 8 times its original volume and is heated to 75° to 85° C for 30 to 90 minutes, thereby producing a semi-rigid, self supporting foam. The foam may be used for insulation, for floatation in boats and as a light weight strengthening agent in airplanes.

EXAMPLE V

About 20 parts by weight of silicic acid as produced in Example 1, about 30 parts by weight of fumeric acid and about 5 parts by weight of sodium carbonate are mixed, then heated to 150° C to 250° C while agitating for about 30 to 60 minutes at ambient pressure, thereby producing a gravy, granular compound, fumeric acid silicic anhydride. About 20 parts by weight of propylene glycol are mixed with the fumeric acid silicic anhydride then heated to 150° to 250° C while agitating for about 30 minutes, then sulfuric acid is added until the pH is about 5.5. The mixture is then heated to 150° to 250° C for 30 to 60 minutes, thereby, producing a solid, light gray polyester-silicate resinous product.

EXAMPLE VI

About 20 parts by weight of silicic acid as produced in Example I, 15 parts by weight of phthalic acid, 5 parts by weight of maleic acid, 15 parts by weight of glycerol, 5 parts by weight of ethylene glycol and 4 parts by weight of sodium carbonate are mixed, then heated to above the melting temperature of phthalic acid and below the boiling temperature of ethylene glycol (150° to 250°), while agitating for 30 to 90 minutes, thereby producing a polyester-silicate resinous product.

The reaction may be carried out in a container equipped with a reflux condenser, agitator, sparger, a foam breaker and hve a suitable means for sampling and discharge. A lighter color is produced if the reactions are carried out under an inert atmosphere, usually carbon dioxide or nitrogen. A vacuum may be applied to the reactor to remove the water.

The hot liquid polyester-silicate resinous product may run into a tank of solvent such as acetic acid, to produce a solution. This solution may be used as a protective coating for wood.

EXAMPLE VII

About 20 parts by weight of dry granular silicic acid as produced in Example 3, 20 parts by weight of adipic acid, 40 parts by weight of triethylene glycerol and 1 part by weight of sodium hydroxide are mixed then heated to 150° to 250° C for 30 to 90 minutes while agitating under ambient pressure, thereby producing a polyester-silicate resinous product.

EXAMPLE VIII

About 20 parts by weight of dry granular silicic acid, 40 parts by weight of terephthalic acid, 20 parts by weight of ethylene glycol and about 3 parts by weight of sodium carbonate are mixed then heated to 150° C to 250° C for 30 to 90 minutes while agitating under ambient pressure then under a vacuum for 20 to 30 minutes, thereby producing a polyester-silicate resinous product.

EXAMPLE IX

About 20 parts by weight of dry granular silicic acid, 20 parts by weight of succinic acid, 30 parts by weight of trimethyol ethane and 7 parts by weight of sodium acetate are mixed, then heated to 150° C to 250° C for 30 to 90 minutes while agitating under ambient pressure, thereby producing a polyestersilicate resinous product.

EXAMPLE X 20 parts by weight of dry granular silicic acid, 40 parts by weight of 10-hydroxy undecanoic acid and 5 parts by weight of sodium carbonate are mixed then heated to 150° C to 250° C while agitating at ambient pressure for 30 to 90 minutes or until the desired viscocity is obtained, thereby producing a polyestersilicate resinous product.

EXAMPLE XI 20 parts by weight of dry granular silicic acid, 40 parts by weight of ethylene sebacic acid and 3 parts by weight of potassium carbonate are mixed, then heated to 150° C to 250° C while agitating at ambient pressure for 30 to 90 minutes, thereby producing a polyester-silicate resinous product.

EXAMPLE XII 20 parts by weight of a dry granular silicic acid, 40 parts by weight of phthalic acid, 20 parts by weight of glycerol, 10 parts by weight of ethylene glycol and 1 part by weight of potassium hydroxide are mixed then heated to 150° C to 250° C while agitating at ambient pressure in a vessel with a reflux condenser for 30 to 90 minutes, thereby producing a polyester-silicate resinous product.

EXAMPLE XIII

About 20 parts by weight of dry granular silicic acid, about 10 parts by weight of linseed oil, 20 parts by weight of glycerol and 5 parts by weight of sodium carbonate are mixed, then heated to 150° to 200° C while agitating at ambient pressure for 30 to 90 minutes, thereby producing a brown, oil modified polyester-silicate resinous product.

EXAMPLE XIV

About 20 parts by weight of dry granular silicic acid, about 80 parts by weight of polyethylene glycol (320 to 480 mol wt.), and 40 parts by weight of adipic acid are mixed, then heated to 150° to 250° C while agitating for 30 to 90 minutes, thereby producing a thick polyester-silicate resinous product.

The polyester-silicate resinous product is soluble in acetic acid. The solution was filtered and about 35 to 45 percent of the silicic acid was unreacted; poor results are obtained when no alkali catalyst is used.

EXAMPLE XV

About 20 parts by weight of dry granular silicic acid, 30 parts by weight of glycerol, 10 parts by weight of adipic acid, 20 parts by weight of maleic anhydride, 5 parts by weight of phthalic anhydride, 10 parts by weight of propylene glycol, 5 parts by weight of triallyl cyanurate, 1 part by weight of diallyl maleate and 8 parts by weight of sodium carbonate are mixed, then heated to 150° to 250° while agitating at ambient pressure for 30 to 90 minutes, thereby producing a polyester-silicate resinous product.

About 3 parts of the said polyester-silicate resinous product and about 2 parts by weight of tolylene diisocyanate are mixed, then agitated while keeping the temperature below 100° C for 10 to 20 minutes until the mixture has a smooth, creamy appearance. To this mixture, add 2 to 3 percent by weight (based on weight of polyester-silicate condensation product) of ditertiarybutyl peroxide and mix well. In about 30 to 40 minutes, add 10 percent (based on the weight of the mixture) of a 10 percent aqueous solution of sodium dioctyl sulfosuccinate, then mix for 5 to 15 minutes until foaming begins. The foam is then heated to 100° to 200° C for 1 to 3 hours, thereby producing a rigid, strong foam.

EXAMPLE XVI

Polyester-silicate resinous product is produced by the following steps:
(a) mixing about 20 parts by weight of dry granular silicic acid, 30 parts by weight of glycerol, 10 parts by weight of diethylene glycol, 30 parts by weight of adipic acid, 10 parts by weight of phthalic anhydride and 5 parts by weight of sodium carbonate;
(b) heating said mixture to 150° to 250° C while agitating for about 30 minutes, then
(c) adding glacial acetic acid until the pH is 5 to 6 (as tested in an aqueous solution);
(d) heating said mixture at a temperature between 150° and 250° C for 30 to 90 minutes, thereby
(e) producing a polyester-silicate resinous product,

EXAMPLE XVII

Polyester-silicate resinous product is produced by the following steps:
(a) mixing about 1 mol of silicic acid (mols calculated on the amount of silicon dioxide that is produced), about one mol of adipic acid and about 0.1 mol sodium carbonate, then heating to 150° to 250° C while agitating for about 30 minutes, thereby producing silicic adipic acid anhydride;
(b) mixing the silicic adipic acid anhydride (HO.OC-$_6$O.O.SiO.OH), with 1 mol glycerol and 0.1 mol of trimethylol propane;
(c) heating the mixture to 150° to 250° C while agitating for 30 to 60 minutes, thereby
(d) producing a polyester-silicate resinous product.

EXAMPLE XVIII

Polyester-silicate resinous product is produced by the following steps:
(a) mixing 20 parts by weight of a dry granular silicic acid, 10 parts by weight of fumaric acid, 10 parts by weight of maleic anhydride, 20 parts by weight of ethylene glycol and 4 parts by weight of sodium carbonate;
(b) heating said mixture to 150° C to 250° C for 30 to 90 minutes, thereby
(c) producing a thick liquid (viscocity of 500 to 1500 poises), polyester-silicate resinous product;
(d) mixing about 10 parts of said polyester-silicate resinous product with about 2 to 3 parts by weight of styrene;
(e) adding cobalt naphthenate (30 to 100ppm of cobalt metal) and 0.2 to 0.5 parts by weight of methyl ketone peroxide;
(f) mixing the mixture at a temperature between 30° to 60° C, thereby
(g) producing a hard, solid, polyester-silicate resinous product in 10 to 30 minutes.

EXAMPLE XIX

Polyester-silicate resinous product is produced by the following steps:
(a) mixing about 20 parts by weight of a dry granular silicic acid, 10 parts by eight of phthalic acid, 10 parts by eight of diethylene glycol bis(allyl carbonate), 10 parts by weight of ethylene glycol and 3 parts by weight of sodium carbonate;
(b) heating said mixture to a temperature of 150° to 250° C for 30 to 90 minutes, thereby
(c) producing a polyester-silicate resinous product.

EXAMPLE XX polyester-silicate resinous product is produced by the following steps:
(a) mixing about 20 parts by weight of a dry granular silicic acid, about 40 parts by weight of castor oil and 4 parts by weight of potassium carbonate;
(b) heating said mixture to a temperature of 150° to 250° C while agitating for 30 to 60 minutes, thereby producing castor oil silicate, a tan thick liquid;
(c) mixing about 20 parts by weight of itaconic acid and said castor oil silicate;
(d) heating said mixture to a temperature of 150° to 250° C while agitating at ambient pressure for 30 to 60 minutes, thereby
(e) producing polyester-silicate resinous product. Further steps may be taken to produce urethane foam:
(f) mixing about 2 parts of said polyester-silicate resinous product with 1 to 2 parts by weight of toluene diisocyanate (80% of 2,4 and 20% of 2,6 isomers) then agitating for 10 to 20 minutes, thereby
(g) producing a polyurethane resinous product;
(h) adding a foaming agent, 3% by weight of an aqueous solution containing 10% sodium dioctyl sulfosuccinate, then mixing the mixture for 10 to 30 minutes until the foam begins to rise, then
(i) heating the urethane for 1 to 2 hours at a temperature between 100° to 200° C, thereby
(j) producing a rigid polyurethane silicate foam.

Although certain specific preferred ingredients and conditions are described in conjunction with the above detailed description of the Invention and Examples, these may be varied and other ingredients may be used where suitable, with similar results. For example, various cross-linking or modifying agents may be used.

Other applications, modifications and ramifications of this invention will occur to those skilled in the art upon reading this disclosure; these are intended to be included within the scope of this invention, as defined in the appended claims.

I claim:

1. The process for the production of polyester silicate resinous products by the following steps:
   (a) mixing 20 parts by weight of dry granular silicic acid, 20 to 40 parts by weight of a polycarboxylic acid, selected from the group consisting of maleic acid, phthalic acid, succinic acid, oxalic acid, malonic acid, glutaric acid, adipic acid, pimelic acid, suberic acid, isophthalic acid, fumaric acid, azelaic acid, sebacic acid, terephthalic acid, itaconic acid, malic acid, diglycolic acid, tartaric acid, and mixtures thereof, 20 to 40 parts by weight of a polyhydroxyl alcohol, selected from the group consisting of ethylene glycol, propylene glycol, butylene glycol, trimethylene glycol, tetramethylene glycol, pentamethylene glycol, hexamethylene glycol, diethylene glycol, triethylene glycol, polybutylene glycol, bis($\beta$-hydroxyethyl) terephthalate, Bisphenol A, resorcinol, 2,2'-oxydiethanol, glycerol, di and tripentaerythritol, trimethylol propane, glycerol monochlorohydrin, sorbitol, mannitol, trimethylol ethane, and mixtures thereof, and an alkali catalyst in the proportion of 1 to 10 percent by weight, amount based on the weight of polycarboxylic acid, polyhydroxyl alcohol and silicic acid, selected from the group consisting of sodium carbonate, sodium hydroxide, potassium hydroxide, and potssium carbonate;
   (b) heating said mixture to a temperature between the melting and boiling temperature of said polyhydroxyl alcohol, 150° to 250° C, while agitating for 30 to 90 minutes at ambient pressure, thereby
   (c) producing a polyester-silicate resinous product.

2. The process according to claim 1 wherein an additional step is taken following step (c) consisting of adding a catalytic amount of a peroxide initiator, selected from the group consisting of acetyl benzoyl peroxide, peracetic acid, methyl ethyl ketone peroxide, cyclohexanone peroxide, cyclohexyl hypoperoxide, 2,4-dichlorobenzoyl peroxide, cumene hypoperoxide, tert-butyl hydroperoxide, methyl amyl ketone peroxide, lauroyl peroxide, benzoyl peroxide, tert-butyl perbenzoate, di-tert-butyl diperphthalate, p-chlorobenzoyl peroxide, dibenzol diperoxide and mixtures thereof.

3. The process according to claim 1 wherein additional steps are added following step (c) consisting of
   (d) adding a vinyl monomer, selected from the group consisting of vinyl acetate, styrene, methacrylic acid, methyl methacrylate, vinyl toluene, acrylic acid, acrylonitrile, divinyl benzene and mixtures thereof, in the amount of 20 to 30 percent by weight, percentage based on the weight of the polyester-silicate resinous product, then
   (e) adding and mixing a catalytic amount of a peroxide initiator and activator consisting of methyl ketone peroxide in the amount of 0.2 to 0.5 parts by weight and cobalt naphthenate in the amount of 30 to 100 ppm of cobalt metal at a temperature of 30° to 60° C, thereby
   (f) producing a polyester-silicate resinous product.

4. The process according to claim 1 wherein a portion of the dicarboxylic acid is replaced with a dicarboxylic anhydride, selected from the group consisting of phthalic anhydride, maleic anhydride, succinic anhydride, glutaric anhydride, poly(adipic anhydride), tetrachlorophthalic anhydride, camphoric anhydride, diglycolic anhydride, pyromellitic anhydride tetrahydrophthalic anhydride, dodecenylsuccinic anhydride, hexadecylsuccinic anhydride, nitrophthalic acid anhydrides and mixtures thereof.

5. The process according to claim 1 wherein a portion of the polycarboxylic acid is replaced with a vegetable oil, selected from the group consisting of soya bean oil, linseed oil, cottonseed oil, tung oil, fish oil, perilla oil, oiticica oil, sunflower oil, safflower oil, walnut oil, dehydrated castor oil, monoglyceride of vegetable oils and mixtures thereof.

6. The process according to claim 1 wherein a portion of the polycarboxylic acid is replaced with a linear organic carbonate, selected from the group consisting of p-xylene glycol bis(ethyl carbonate), diethylene glycol bis(allyl carbonate) and mixtures thereof.

7. The process according to claim 1 wherein a portion of the polyhydroxyl alcohol and polycarboxyl acid is replaced with an organic compound containing hydroxyl and carboxylic radicals, selected from the group consisting of 10-hydroxy undecanoic acid, 2-hydroxy decanoic acid, $\omega$-hydroxy pentadecanoic acid, and mixtures thereof.

8. The produce, polyester-silicate resinous product, as produced by the process of claim 1.

* * * * *